Figure 1A:
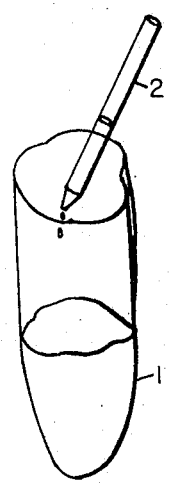

Dec. 20, 1966   F. V. KOSIKOWSKI   3,293,147
MEASURING THE PRESENCE OF ENZYME REACTIONS
Filed Aug. 17, 1964

INVENTOR.
Frank V. Kosikowski
BY Ralph R. Barnard
HIS ATTORNEY

United States Patent Office 3,293,147
Patented Dec. 20, 1966

3,293,147
MEASURING THE PRESENCE OF ENZYME REACTIONS
Frank V. Kosikowski, Ithaca, N.Y., assignor to Cornell Research Foundation, Inc., Ithaca, N.Y., a corporation of New York
Filed Aug. 17, 1964, Ser. No. 390,003
9 Claims. (Cl. 195—103.5)

This invention relates generally to measuring actions and more particularly to a new and improved method of measuring and testing for the presence of specific types of enzymes and enzymatic reactions in biological fluids and materials.

The measuring and testing of specific types of enzymes and enzymatic reactions within biological fluids and materials is an important function in the medical, biological and food science fields. When biological materials are tested they are usually suspended in a fluid. This measuring and testing can be of two general types. First, the measuring can be to determine the quantity of a chemical substrate subject to change by a specific enzyme which is present in a particular biological fluid. Secondly, the measuring can be to determine the quantity or activity of a specific type of enzyme within a particular biological fluid assuming there is a sufficient quantity of a natural substrate, or one added thereto, which will be changed by that specific enzyme. These tests may be of the simple screening type or the substantially more accurate laboratory type.

The biological fluids and materials which are tested for enzymes and enzymatic reactions have included blood, meat, urine, eggs, milk and milk products such as cheese, etc. Typically, the test involves placing the biological fluid and material in an environment which results in the particular type of enzymatic reaction under test; waiting for the enzymatic reaction to take place; and then measuring the amount of the product or products from that particular enzymatic reaction occurring in the resulting biological fluid or tissue. More specifically, the environment for a particular enzymatic reaction requires the presence of the particular chemical substance (substrate) to be changed or split by the specific type of enzyme, the optimum pH and optimum temperature range and the absence of critical enzyme inhibiting substances, etc. Furthermore, it is important that the detection of the presence of the product or products of a specific enzymatic reaction be detectable without the interference of other substances.

An example of the prior art in this field of the measuring of enzymatic reactions is embodied in an article entitled "The Effectiveness of the Cornell Phosphatase Test for Dairy Products" which appeared in the Journal of Dairy Science, volume 34, on page 1151, in December 1951, by F. V. Kosikowski, the inventor of the present application.

With respect to this and all of the other prior art for measuring specific types of enzymatic reactions it may be said that they each have one or more of the following shortcomings:

(1) When a high degree of sensitivity and accuracy is desired in quantitively measuring enzymatic activity, laboratory procedures are required taking a long time, up to approximately twenty-four hours. The tests requiring the shortest time periods do not combine the accuracy and sensitivity of a many step laboratory procedure and are in effect only screening tests.

(2) Sufficiently large samples of the biological fluid and material under test which would give good test reproducibility, sensitivity and consistency cannot be used in the prior art testing methods because the larger samples increase the presence of interfering chemical substances which hinder the easy detection of the product or products of the specific enzymatic reaction being measured. If larger samples could be used an error in test procedures of a given magnitude will show up as a proportionately smaller error in the overall test results.

(3) When the biological fluid or material under test is a solid it must be modified to a liquid suspension form, usually by mechanical means, prior to insertion into the test container which increases the testing time, the possibility of contamination and the equipment.

(4) The method of laboratory testing in accordance with the prior art is complex requiring many steps including centrifugation and extraction or filtration and requiring a considerable amount of laboratory equipment.

In the medical, biological and food science fields of measuring and testing, considerable use has been made of the dialysis process for separating crystalloid substances from colloid substances in a mixture based on the principle that crystalloids will diffuse readily through a moist membrane while the colloids will not diffuse. In fact, the dialysis process has been used in the clarification of a biological fluid prior to undergoing enzymatic activity as a part of the measuring and testing of the biological fluid and material as to a particular type of enzymatic reaction. However, the dialysis process has never been integrated into the measuring and testing of a particular type of enzymatic reaction during the time the enzymatic reaction is taking place for the purpose of separating the product or products of that enzymatic reaction.

Accordingly, it is therefore a primary object of the present invention to provide a new and improved method of measuring and testing for the presence of specific enzymes and for enzymatic activity in biological fluids and materials.

It is another object of the present invention to provide a new and improved method of measuring and testing the presence of specific enzymes and enzymatic reactions in biological fluids and materials which requires only a relative short operational time period and yet gives a relatively high accuracy.

It is an additional object of the present invention to provide a new and improved method of measuring and testing for the presence of specific enzymes and enzymatic reactions in biological fluids and materials utilizing a relatively large sample of that fluid or material so that good test reproducibility, sensitivity and consistency can be obtained.

It is still an additional object of the present invention to provide a new and improved method of measuring and testing for the presence of specific enzymes and enzymatic reactions in biological materials which are normally in solid or semi-solid form.

It is still another object of the present invention to provide a new and improved method of measuring and testing for the presence of specific enzymes and enzymatic reactions of biological fluids and material which is simple so as to minimize the number of steps and the requirement for special equipment.

It is another object of the present invention to provide a new and improved method of measuring and testing for the quantity or activity of a particular type of enzyme within a biological fluid and material by adding substrate as required or assuming the sufficiency of a particular type of enzyme within a biological fluid and material measuring and testing the concentration of necessary substrate naturally present therein which will be attacked by that particular type of enzyme.

Briefly these and other objects of the present invention are provided by placing in a dialysis bag the biological fluid and material to be tested including a chemical substrate and a buffer which is subject to the particular type of enzyme activity under test and which forms a product or products which is dialyzable, incubating the ag and contents while it is immersed in a solution so that a product of the specific type of enzymatic activity within the bag passes through the bag, measuring the quantity of a product of the specific enzymatic activity to provide an indication of the magnitude of that enzymatic activity.

Figure 1B:
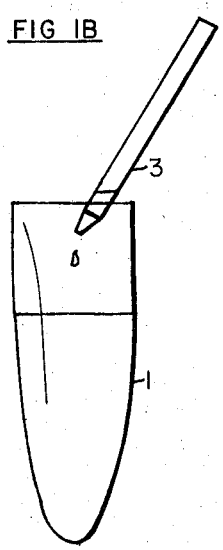
Figure 1C:
Figure 2:
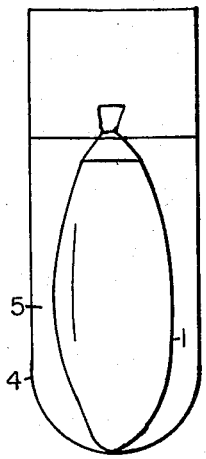
Figure 3:
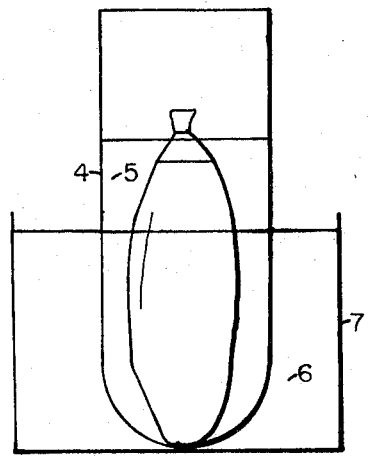
Figure 4:
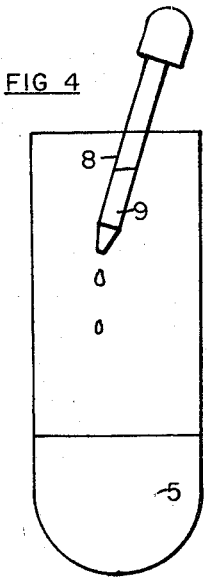

Other objects of the present invention will be apparent to those skilled in the art upon study of the accompanying disclosure and also drawings in which:

FIGURES 1A, 1B and 1C show the filling and sealing of a dialysis bag as a first step in accordance with the teachings of the present invention, FIGURE 2 shows the placing of a dialysis bag with knotted end containing biological material into a test tube of immersing solution as a second step in accordance with the teachings of the present invention, FIGURE 3 shows the incubation of the dialysis bag, its contents and the solution in which it is immersed as a third step in accordance with the teachings of the present invention; and FIGURE 4 shows the adding of a dye to produce color related to the quantity of a product of a specific type of enzyme activity which passed during the incubation period into the immersing solution from within a dialysis bag as a further step in accordance with the teachings of the present invention.

Referring again to FIGURES 1A and 1B, an essential step is to place within a dialysis bag the biological fluid and material under test for a specific type of enzymatic activity. A specific type of enzymatic activity within the biological material placed in the bag will depend not only on the presence of that particular type of enzyme in the biological material but also the presence of a proper type of chemical substrate upon which that enzyme will act. If such a substrate is not present in the biological material in sufficient concentration, an acceptable substrate may be added to the dialysis bag as a first step of the test as shown in FIGURE 1A. Numeral 1 represents the bag and numeral 2 represents the pipette means of adding the substrate. Moreover if the particular type of enzymatic reaction under test requires a certain pH environment which is not naturally present in the biological material, a buffer chemical may be also added to the dialysis bag contents. The buffer and substrate chemicals may of course be pre-mixed and then added to the dialysis bag in one step as depicted by the partially filled dialysis bag of FIGURE 1A.

FIGURE 1A shows the adding of the biological material via pipette means 3. The order in which the buffer substrate chemicals or the biological material are added to the dialysis bag 1 is not critical but adding the biological material to the buffer substrate is preferable because less opportunity for outside contamination exists and if the biological material is in a non-liquid form (i.e. partial semi-solid or solid form etc.) it is more conveniently added to the bag. Thereafter, the dialysis bag should be sealed well at the top by any conventional means including knotting as shown in FIGURE 1C. If the biological material is other than a liquid type, the contents of the sealed bag should be kneaded gently with the fingers working the material into uniform suspension into the buffer substrate.

The dialysis bag or container 1 may be made of any suitable material sufficiently porous to provide for the passage of crystalloids there through while not permitting the passage of colloids, such as cellulose of a known port diameter.

Thereafter, in accordance with the teachings of the present invention, the dialysis bag 1 and its contents should be placed in a container such as a test tube 4 partially filled with a solution 5 as shown in FIGURE 2. The nature of the solution 5 will vary depending on the type of enzymic reaction under test. However, in many cases, the solution 5 may be of an aqueous type such as distilled water.

Thereafter, in accordance with the teachings of the present invention, the aqueous solution 5 with the dialysis bag 1 and contents immersed therein is incubated by conventional means, exemplified by heated water as shown in FIGURE 3. Therein the water 6 in container 7 is controlled by conventional means so that the contents of the dialysis bag 1 is maintained at the most optimum temperature level for the occurrence of the particular enzymatic reaction under test. As that enzymatic reaction takes place a product or products of that enzymatic reaction will pass through the dialysis bag 1 (which has been especially selected as to pore size) into the aqueous solution (along with buffer components and/or substrate when it is soluble in the immersing solution). However, because of the pore size of the dialysis bag, the normally interfering substances such as proteins and many of its components are retained in the bag.

After those enzymatic reactions have continued at the optimum rate for a time period so that the quantity of a product which has passed into the solution 5 is a representative sample of the magnitude of that type of enzymatic reaction under test, the incubation may be discontinued and the dialysis bag removed intact from the solution 5 and discarded. Within the teachings of the present invention, the quantity of the product of the particular type of enzymatic reaction under test within the solution 5 may be determined in a number of ways. For example, with some types of enzymatic reactions, the pH of the solution 5 may be representative. In other types of enzymatic reaction tests, a coloring reagent may be added to the solution 5 as shown in FIGURE 4. Therein eye dropper 8 is shown adding reagent 9 into the solution 5. In case of pH or color development or some other type of measure the results must be compared against calibrated standards.

To illustrate the teachings of the present invention more specifically, assume that it is desired to determine the degree with which milk and the milk used to make cheese had been properly pasteurized. As those skilled in the art know, a standard method to determine a sufficient degree of pasteurization of those products is to determine that there is substantially little of an enzyme known as an alkaline phosphatase left therein.

To perform such a test in accordance with the teachings of the present invention one could proceed by adding to the dialysis bag 1, as shown in FIGURE 1A, 10 milliliters of a combined and warm buffer substrate fluid such as a high strength carbonate-bicarbonate buffer substrate. This fluid may be made as follows: Dissolve 11.5 g. anyhdrous, sodium carbonate, $Na_2CO_3$. 10.2 g., anhydrous, sodium bicarbonate, $NaHCO_3$, and 1.1 g. pure disodium phenylphosphate in distilled water to make up to one liter.

The next step in accordance with the teachings of the present invention would be to add about 5 milliliters of the milk under test as shown in FIGURE 1B and then close the dialysis bag by knotting and shown in FIGURE 1C. When cheese is being tested, rather than the milk itself, a 1.0 gram sample of the cheese may be inserted into bag 1 and the tied bag gently kneaded with the fingers so that the cheese or other solid is suspended in the warm buffer-substrate solution. The disodium phenylphosphate is functioning as the substrate to be catalyzed by the phosphatase and the anhydrous, sodium carbonate and the anhydrous, sodium bicarbonate are functioning to strongly maintain the pH in the range of 9.5–9.7 which is necessary to permit the optimum alkaline phosphatase reaction with the substrate. For the proportions cited an 8 inch length section of cellulose dialyzing tubing sold under size identity number 27 by the Visking Company 6733 W. 65th Street, Chicago, Illinois properly knotted at the bottom and top will function as the dialysis bag 1 of the figures.

The next step of the test is to then immerse the bag 1 and contents in 10 milliliters of an aqueous solution 5 in a test tube 4 as shown in FIGURE 2. While distilled water may be used as the aqueous solution, a copper sulfate solution can be used to good advantage to achieve brilliancy in the blue color development which comprises the measuring step which is discussed hereinafter. The copper sulfate solution can be made by dissolving 0.1 g. of $CuSO_4 5H_2O$ in a liter of distilled water. The test tube 4 of FIGURE 2 may be of large mouth 25 x 150 milliliter size.

The test tube 4 and aqueous solution 5 may then be incubated in a water bath as shown in FIGURE 4 at a temperature of 37 degrees centigrade so that a phosphatase reaction takes place in proportion to the concentration of phosphatase in the sample at an optimum rate. Phenol is formed as a soluble product of this reaction and as quickly as it is formed almost equilibrium quantities pass through the dialysis bag 1 into the aqueous solution so that the phenol is distributed rather evenly throughout the total contents of the test tube 4. The buffer components being soluble will also move in rapid fashion through the bag and distribute themselves evenly through the contents of the test tube thus creating optimum pH conditions for later blue color development. However, the proteins and other interfering and inhibiting substances of the milk product sample as colloids are retained within the bag 1 so that the measuring of the phenol in the aqueous solution 5 representing the degree of underpasteurization of the milk product is unobscured and sensitive to the smallest amount of phenol detected.

In this example, the incubation can be continued for time periods ranging from under 15 minutes to about one hour depending on the test sensitivity desired. A time period of one hour will give the same or greater sensitivities as obtained by prior art methods with an incubation period up to 24 hours.

After the incubation step, the dialysis bag preferably should be removed and two drops of a coloring reagent such as CQC added to the aqueous solution 5. This coloring reagent is well known in the art and can be made by dissolving 0.2 gram of dichloroquinonechloromide crystalline in 25 milliliters of absolute ethyl, absolute methyl or 95 percent ethyl alcohol. To the degree that a blue color appears, phenol is present in the aqueous solution 5 representing the quantity of alkaline phosphatase present in the milk product sample (and the degree of underpasteurization as high temperatures destroy or inactivate this enzyme in milk).

The magnitude of the blue can be measured by conventional methods using a standard colorimeter with an appropriate calibration curve or phenol color standard in various forms including graduated plural test tubes.

Of course many detailed refinements in the simple test procedures outlined hereinabove may be included to facilitate the progress of the test without departing from the teachings of the present invention and without substantially extending the time period required and the requirement of a minimum of equipment and chemical reagents.

It should be noted that in the prior art methods for measuring and testing the alkaline phosphatase enzyme in milk and cheese the folllowing maximum proportions have been used: 1 milliliter of milk/10 milliliters of buffer-substrate; and .5 gram of cheese/10 milliliters of buffer-substrate. By contrast, the example of the teachings of the present invention for these same biological materials used five times as much milk in the test sample and two times as much cheese in test sample. This increased sample size is the direct result of the fact in accordance with the teachings of the present invention the phenol (product of the enzymatic reaction) is passed through the dialysis bag into the immersing solution where it is completely isolated from the proteins and components of proteins of the sample which interfere with the accurate detection of the magnitude of the phenol. This increased sample size results in good test reproducibility, sensitivity and consistency. This same benefit will be true for the measuring and testing of other enzymatic reactions in accordance with the teachings of the present invention. Of course, the selection of the buffer, the substrate, the dialysis bag as to size of pores, etc., will vary with the type of specific enzymatic activity being measured.

It should be clear that the simple methods taught can, in many cases, be practiced by those relatively unskilled in the art, by the supply to them of test kits with instructions including dialysis bags (dry or wetted), properly selected buffer-substrate in tablet or liquid form and dye prepared for use in a similar manner. Such a test kit could include a minmum of necessary material and/or a number of stable inorganic color standards.

While the invention has been particularly shown and described with reference to preferred embodiments thereof, it will be understood by those skilled in the art that the foregoing and other changes in form and details may be made therein without departing from the spirit and scope of the invention.

I claim:
1. The method of measuring enzymes and enzymatic reactions comprising placing in a dialysis bag biological fluid and material to be tested, including a buffer and a chemical substrate, which is subject to a specific type of enzyme activity under test and which breaks down to a dialyzable product, incubating said bag and contents while it is immersed in a solution so that a product of the specific type of enzymatic activity within the bag passes through the bag, and measuring the quantity of a product of the specific enzymatic activity to provide an indication o fthe magnitude of that enzymatic activity.

2. The method of measuring enzymatic activity in a biological material comprising placing in a dialysis bag a biological material to be tested, including a buffer and a chemical substrate, which is subject to the specific type of enzyme activity under test and which forms a dialyzable product, incubating the bag and contents while it is immersed in a solution so that the product of the particular type of enzymatic activity within the bag passes through the bag into said solution, measuring the quantity of the product of the specific enzymatic activity by the change in color, adding a coloring reagent into said solution to provide an indication of the magnitude of that enzymatic activity.

3. The method of measuring a specific type of enzymic activity in biological material comprising, filling a dialysis bag with a biological material to be tested, including a buffer and a chemical substrate, which is subject to the particular type of enzymatic activity and forms a product which is dialyzable, incubating the bag and contents while it is immersed in a solution so that the product of the specific type of enzymatic activity within the bag passes through the bag, along with buffer components, removing the bag from the aqueous solution, adding a coloring reagent responsive to said product of the specific type of enzymatic activity, measuring the concentration of the product of the specific type of enzymatic activity under test by the degree of color development in said solution to provide an indication of the magnitude of that enzymatic activity.

4. The method of measuring a particular type of enzymatic activity comprising partially filling a dialysis bag with biological material to be tested, adding a chemical substrate which is subject to the particular type of enzymatic activity under test and which forms a product which is dialyzable, adding a buffer chemical substance which will render the contents of the dialysis bag at a proper pH for the particular type of enzymatic activity under test, incubating the bag and contents while it is immersed so that a product of the particular type of enzymatic activity within the bag passes through the bag into said solution, measuring the concentration of a product of the particular enzymatic activity which is present in said solution to provide an indication of the magnitude of that enzymatic activity.

5. The method of measuring phosphatase enzyme activity in milk comprising partially filling a dialysis bag with the milk to be tested, adding a chemical substrate which is subject to a phosphatase enzymatic activity and forms a product which is dialyzable, adding a buffer chemical substance to the contents of the bag to render its pH optimum for phosphatase enzymatic activity, incubating the bag and contents while it is immersed in a solution so that a product of that phosphatase enzymatic activity within said bag passes through the bag along with buffer components into said solution, measuring the concentration of the product of the phosphatase enzymatic activity to provide an indication of the magnitude of that activity.

6. The method of measuring phosphatase enzyme activity in a biological material comprising placing in a dialysis bag biological material to be tested including a buffer and a chemical substrate which is subject to phosphatase activity and which breaks down to a dialyzable product, incubating said bag and contents while it is immersed in a solution so that a product of the phosphatase activity within the bag passes through the bag, and measuring the concentration of that product to provide an indication of the magnitude of the phosphatase activity.

7. The method of claim 6 where the biological material under test is milk and the measuring of the product of phosphatase activity, is accomplished by adding a color reagent to the solution and determining the degree of color development.

8. The method of claim 6 where the biological material under test is a milk product, the buffer and substrate is of a carbonate-bicarbonate type and the measuring of the phenol product of phosphatase activity is accomplished by adding a CQC color reagent to the solution and determining the degree of color development.

9. The method of claim 6 where the biological material under test is a milk product and the method is used to determine the degree of the underpasteurization of the milk product as indicated by the degree of phosphatase enzyme activity.

References Cited by the Examiner
UNITED STATES PATENTS
2,995,425   8/1961   Fuhrmann ---------- 23—253

A. LOUIS MONACELL, *Primary Examiner.*

L. M. SHAPIRO, *Assistant Examiner.*